United States Patent Office 3,194,781
Patented July 13, 1965

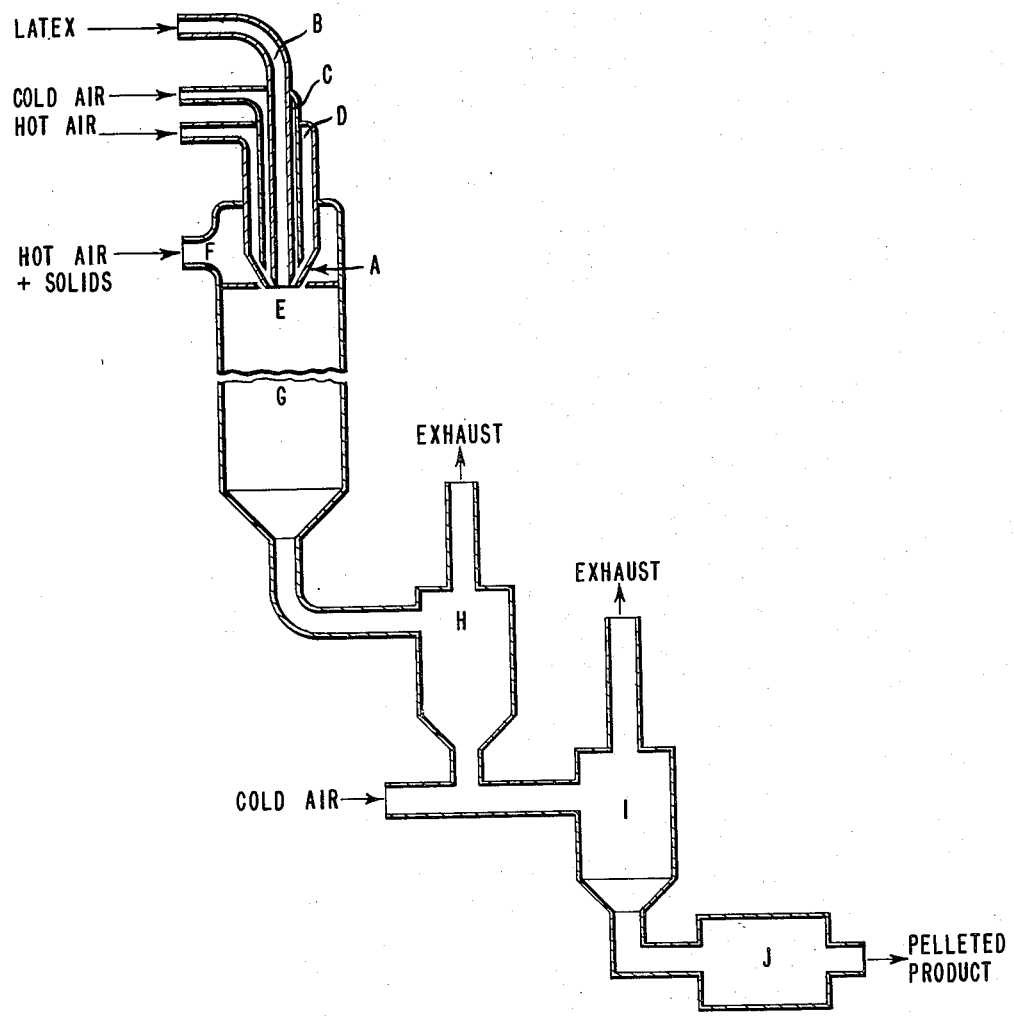

3,194,781
ELASTOMERS COMPOUNDED BY SPRAY DRYING
Johan Gustav Hedberg, Wilmington, Del., and Harry Bernard O'Donnell III, Louisville, and Gilbert Willison Peet, Jeffersontown, Ky., assignors to E. I. du Pont de Nemours and Company, Wilmington, Del., a corporation of Delaware
Filed June 24, 1960, Ser. No. 38,626
5 Claims. (Cl. 260—33.6)

This invention is directed to a process for the compounding of elastomers for their conversion into cured products. More particularly, the present invention is also directed to making a completely compounded elastomer in powder form.

In converting an elastomer into the final article of manufacture, it is usually necessary first to incorporate the reinforcing agents, pigments, fillers, and vulcanizing agents and accelerators by milling or by the use of internal mixers. This is a laborious operation and must be frequently repeated, since the compounded material is difficult to store without deteriorating due to spontaneous curing.

It would be desirable to have a completely compounded elastomer in the form of a powder which, like molding powders in the plastic field, would be stable in long term storage and would require only heating under pressure to convert it to a finished article of manufacture. This would allow pre-compounded elastomers to be made cheaply on a large scale and used as needed or even sold to manufacturers who would thus avoid using expensive milling and mixing equipment. There are many difficulties in making such pre-compounded elastomer powder. It is well known that it is impractical to get elastomers in finely divided form by direct methods of grinding and comminuting. One method for making finely divided elastomers is spray drying the elastomer latex but there are difficulties here because of the tendency of the resulting particles to agglomerate. It has been found that finely divided inorganic compounding ingredients may be incorporated during the spray drying and that they reduce agglomeration but there is the further difficulty in making a completely compounded elastomer by this method that heat-sensitive ingredients such as certain organic accelerators are destroyed or caused to react prematurely by the high temperatures required for spray drying. When these sensitive ingredients are incorporated even at ordinary temperatures by simple mixing with a pre-formed, partly compounded elastomer powder in an attempt to avoid the above difficulty, it is found that they slowly react on storage, causing pre-curing.

It has been found, however, that these difficulties may be overcome and a completely compounded elastomer in powder form, ready for molding; stable on storage and giving cured products fully equal to those made by conventional compounding methods, may be made by the following process as described.

It is an object of this invention to provide a novel process for preparing compounded elastomers in powder form. It is a further object of this invention to provide a compounded elastomer in powder form as produced by the described process. These and other objects will become apparent in the following description and claims.

More specifically, the present invention is directed to a process for preparing a compounded elastomer in powder form by mixing a latex of the elastomer with the vulcanization accelerator dispersed in an oil, atomizing with a gas and mixing the resulting suspended particles with a heated gas containing the inorganic compounding ingredients also suspended in finely divided form, and separating the resulting dry, compounded elastomer.

The term "vulcanization accelerator" includes both single compounds and mixtures.

The present invention is also directed to the compounded elastomers in powder form produced by the heretofore described process.

This invention is applicable to any elastomer, particularly those readily available in latex form, such as natural rubber, polychloroprene, and the butadiene-styrene and butadiene-acrylonitrile copolymers. Chlorosulfonated polyethylene may also be utilized according to the present invention. Any latex of good mechanical and thermal stability, such as those commercially available, is suitable. The inorganic compounding ingredients, used for reinforcing, filling, extending, coloring, and the like, such as carbon black, clay, calcium carbonate, barium sulfate, titanium dioxide, iron oxide, magnesium oxide, zinc oxide, silicon dioxide and lead oxide are supplied for ordinary rubber compounding in finely divided form which is suitable for use in the present invention. Other ingredients, such as antioxidants, provided that they are heat-stable, may be added in finely divided form with the inorganic ingredients. The other ingredients may be liquids at the drying temperatures used, provided that they are not more than 10% by weight of the solids. The accelerators are introduced in at least four times their weight of an oil, which will ordinarily be one used in compounding elastomers, such as petroleum hydrocarbons, fatty oils (glycerides), and oily esters (such as dibutyl phthalate and methyl abietate). Usually the curing accelerator is insoluble and is dispersed as fine particles (the form in which they are normally supplied for use in elastomers) to form a slurry. When the accelerator is a liquid insoluble in oil, it may be dispersed as fine droplets by stirring. When soluble, the solution in oil is of course suitable.

The term "finely divided" as used above means having a particle size no more than 200 microns.

The atomizing, mixing, and drying may be carried out in the apparatus shown diagrammatically in the accompanying drawing. The spray nozzle A consists of three concentric passages B, C, and D. The latex and oil, which are mixed as they pass through a common inlet tube, enter through the central passage B. This is surrounded by a narrow annular passage C through which cold air is introduced to protect the latex from coagulation in the pipe by exposure to the heat from the hot atomizing gas introduced through the outer concentric annular passage D. The spray thus formed is simultaneously mixed with a hot drying gas containing entrained finely divided inorganic ingredients, which passes through a constricted annular space E surrounding the spray nozzle A, after entering the equipment through F. The inorganic ingredients thus partly coat and partly penetrate the partly dried latex droplets and greatly reduces their tendency to agglomerate. The resulting suspension then passes through the drying chamber G in which the drying is completed. The dried but still hot solid particles are separated from the drying gas and water vapor in separator H. The solids from separator H are resuspended in a stream of cold air and then separated therefrom in the second separator I. The solids from this are formed into small pellets in a pelleting machine of standard design J, and are then ready for use.

The atomizing air should be at 40 to 1000° F. and at a velocity between about sonic and about 20% below sonic and supplied at a rate of 1.0 to 1.5 lbs. of air per lb. of liquid. The drying air should be within the above temperature range and in sufficient quantity to complete the drying of the particles during their passage through the drying chamber.

The following representative example illustrates the present invention.

A latex containing 30% of a plastic polychloroprene dispersed in an alkaline aqueous solution of the ammonium salt of disproportionated rosin is mixed with a slurry, made by suspending by stirring 0.5 part of diorthotolyl guanidine, 0.5 part of tetramethyl thiuram monosulfide, 0.4 part of 2-mercapto imidazoline and 1.0 part of sulfur (all finely powdered) in 15 parts of a refined light hydrocarbon oil. This slurry is fed at 4.2 lbs./hr. with the latex at 24 lbs./hr. into a pipe serving as a mixer. The mixture is discharged through the central orifice of the atomizing nozzle at a velocity of about 20 ft./sec. The atomizing gas at 600° F. is introduced at an approximate rate of 100 lbs./hr. and reaches less than sonic velocity. The cooling air is introduced between this and the latex at 15 lbs./hr. The drying gas at 550° F. and 500 lbs./hr. carries in suspension a mixture of 120 parts by weight of clay, 15 of carbon black, 5 of zinc oxide, 4 of magnesium oxide, 4 of paraffin wax, and 2 of phenyl beta-naphthylamine at a rate of 38 lbs./hr. Its discharge velocity through E is 25–30 ft./sec.

The mixture of atomized latex and drying gas containing the suspended inorganic solids passes through the drying chamber 15 ft. high and 3 ft. in diameter and then to the first separator. The residence time in the dryer is about 30 sec. and the exit temperature 190° F. The solids from the separator are resuspended in a stream of cold air, which is introduced at the rate of about 500 cu. ft. per min. The cooled solid particles are separated from this in the second separator, and then compressed into pellets. These are unaltered after at least 3 months storage. When these pellets are compressed in a mold and cured at either 307° F. for 15 min. or 397° F. for 40 sec., or are extruded as an insulating coating upon wire in a conventional extruder and cured, the physical properties are essentially identical with those of a similar elastomer which has been isolated as a solid in mass from the latex, milled with the same compounding ingredients, and cured under the same conditions. This indicates that the compounding ingredients have been uniformly incorporated in the product of the example and that they have not been undesirably altered by the spray drying.

Any of the heretofore-described elastomers may be substituted in the preceding representative example utilizing varied combinations of compounding ingredients as understood by one skilled in the art to achieve substantially the same results described in this example. The temperatures and rates of flow may be varied by one skilled in the art and nitrogen and carbon dioxide, for example, may be substituted for the air utilized as the gas in which the described materials are atomized and suspended.

Variations and modifications of the present invention within the scope of one skilled in the art may be utilized in the practice of said invention.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A process for preparing a precompounded elastomer in powder form which comprises (I) mixing a latex of an elastomer selected from the group consisting of natural rubber, polychloroprene, chlorosulfonated polyethylene, butadiene-styrene copolymers and butadiene-acrylonitrile copolymers with a preformed dispersion of a heat-sensitive organic vulcanization accelerator for said elastomer in an oil selected from the group consisting of petroleum hydrocarbons, glycerides, dibutyl phthalate, and methyl abietate, (II) atomizing the resulting mixture with a gas at a temperature of from 40° to 1000° F., (III) mixing the resulting atomized mixture with a heated gas containing, in finely divided form, an inorganic compounding ingredient selected from the group consisting of carbon black, clay, calcium carbonate, barium sulfate, titanium dioxide, iron oxide, magnesium oxide, zinc oxide, silicon dioxide and lead oxide, and (IV) separating the resulting dry compounded elastomer powder.

2. A process as defined in claim 1 wherein the ratio of oil to accelerator is at least 4 to 1.

3. The storage-stable, precompounded elastomer prepared by the process of claim 1.

4. A process for preparing a precompounded elastomer in powder form which comprises (I) mixing a latex of an elastomer selected from the group consisting of natural rubber, polychloroprene, chlorosulfonated polyethylene, butadiene-styrene copolymers and butadiene-acrylonitrile copolymers with a preformed dispersion of a heat-sensitive organic vulcanization accelerator for said elastomer in an oil selected from the group consisting of petroleum hydrocarbons, glycerides, dibutyl phthalate, and methyl abietate, and passing the mixture out through a pipe, (II) introducing a protecting flow of cold air around said pipe sufficient to prevent coagulation of the latex in said pipe, (III) atomizing the mixture flowing out of said pipe with a heated gas, (IV) mixing the resulting atomized mixture with a heated gas containing, in finely divided form, an inorganic compounding ingredient selected from the group consisting of carbon black, clay, calcium carbonate, barium sulfate, titanium dioxide, iron oxide, magnesium oxide, zinc oxide, silicon dioxide and lead oxide, and (V) separating the resulting dry compounded elastomer powder.

5. The storage-stable, precompounded elastomer prepared by the process of claim 4 wherein the elatsomer is polychloroprene and said oil is a petroleum hydrocarbon.

References Cited by the Examiner

UNITED STATES PATENTS

| | | | |
|---|---|---|---|
| 2,315,924 | 4/43 | Bertram | 260—746 |
| 2,460,546 | 2/49 | Stephanoff | 260—34.2 |
| 2,912,407 | 11/59 | Reynolds | 260—33.6 |
| 3,019,207 | 1/62 | Crane | 260—33.6 |

MORRIS LIEBMAN, *Primary Examiner.*

DANIEL ARNOLD, LEON J. BERCOVITZ, ALEXANDER H. BRODMERKEL, *Examiners.*